United States Patent Office 3,406,761
Patented Oct. 22, 1968

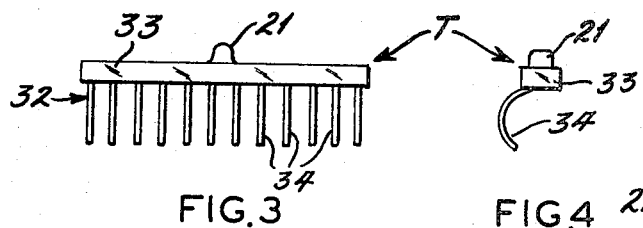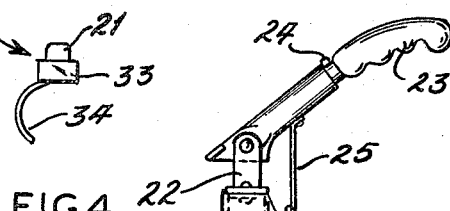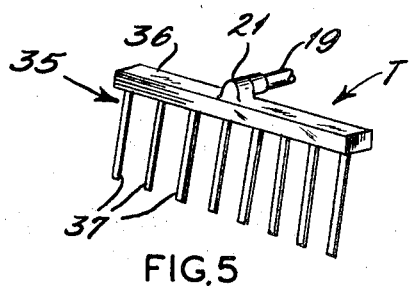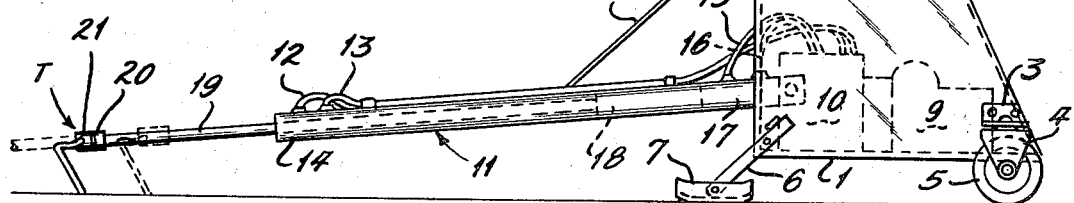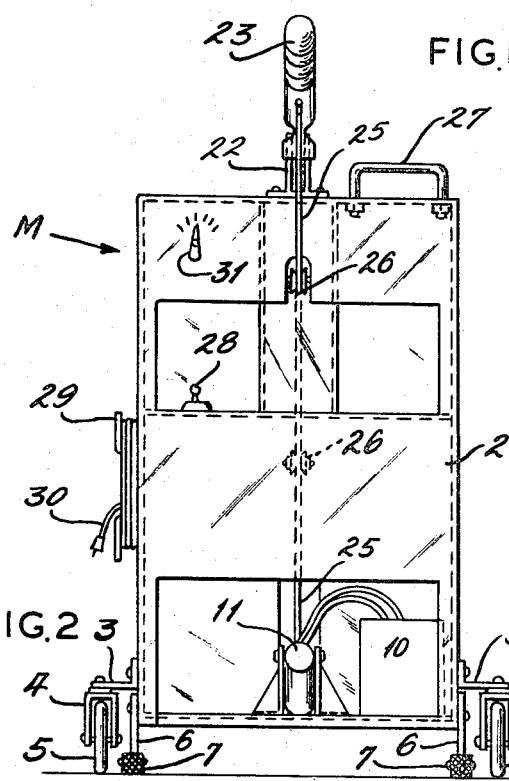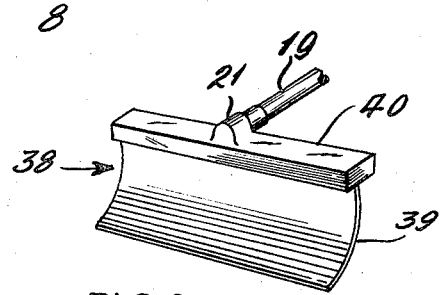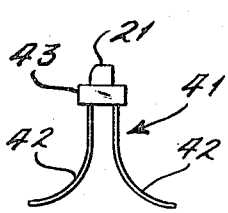

3,406,761
POWER TOOL
Thomas H. Ryan, 1958 Karlin Drive,
St. Louis, Mo. 63131
Filed Oct. 6, 1965, Ser. No. 493,357
12 Claims. (Cl. 172—42)

This invention relates to an improved tool, and in particular, to a power tool which can be used to substitute hydraulic or air power for the arm power previously used by the operator.

The principal object of the present invention is to provide a power tool so that persons can increase their arm power for raking the yard, pushing snow, or other chores. This is especially helpful to persons with heart trouble or other handicaps. Another object is to provide a device which can be moved easily by hand and which has a power cylinder with a tool thereon for doing heavy work. Another object is to provide a device whose power cylinder is substantially parallel or at only a slight angle to the ground so that it gives sufficient pulling power over the entire stroke without having to constantly adjust the angle of said power cylinder and yet remains in contact with the ground because of the weight of the parts.

These and other objects and advantages will become apparent hereinafter.

The present invention is embodied in a machine or power tool comprising a frame, an upstanding carriage, means for conveniently moving said frame and carriage over the ground, a power cylinder extending forwardly of said frame, said cylinder having a piston therein with a rod adapted to receive a tool, said carriage having a movable handle thereon adapted to raise and lower said power cylinder, said handle having a control thereon for supplying fluid under pressure to one side or the other side of said piston within said cylinder for causing said tool to move with respect to the ground.

This invention also consists in the parts and in the arrangements and combinations of parts hereinafter described and claimed. In the accompanying drawings which form part of this specification and wherein like numerals and symbols refer to like parts wherever they occur:

FIG. 1 is a side elevational view of a power tool embodying the present invention, showing the tool in two different positions, FIG. 2 is a rear view thereof, and FIGS. 3 and 4 are front and side views, respectively, of an attachment such as a rake, FIG. 5 is a perspective view of a leaf rake attachment, FIG. 6 is a perspective view of a snow plow attachment, and FIG. 7 is an end view of a snow plow attachment having two sides or blades.

Referring now to the drawings in detail, it will be seen that the embodiment of the invention which has been illustrated comprises a power machine M having a frame 1 with an upstanding carriage 2 thereon. The frame 1 has brackets 3 adapted to receive swivels 4 which hold two wheels 5 at the rear corners of the machine. The forward portion of the frame 1 is provided with two spaced rigidly mounted arms 6 having pivotable shoes 7 thereon with bottoms 8 which are curved or slanted so as to slide on the ground and to keep the machine M from moving forward or back when power is applied to a tool T. The frame 1 supports a motor 9, which may be electric or gasoline. The motor 9 is connected to an oil or air pump and reservoir 10.

A power cylinder 11 is pivotally mounted with respect to said frame 1 and is connected to said pump 10 and extends forwardly of the machine M and has two hose connections 12 and 13 in its forward end 14 and two hose connections 15 and 16 in its rearward end 17 which lead to the pump 10. The power cylinder 11 slidably receives a piston 18 having a rod 19 thereon. The forward portion of said rod 19 is provided with a universal connection 20 for receiving the shank or connector 21 of a tool T, such as a rake, broom, snow plow (either single or double bladed), concrete float, or other device for doing a specific job.

The upper portion of the carriage 2 is provided with a bracket 22 which receives a movable handle 23 having a control switch 24 thereon which can be operated by the thumb or a finger without the hand of the operator leaving the handle 23. Flexible means, such as a cable 25 are connected between the handle 23 and the cylinder 11 with guide rollers 26 or other guide means therebetween, so that moving the handle 23 up and down moves the cylinder 11 up and down a predetermined amount. The carriage 2 is also provided with a fixed handle 27 secured thereto for moving the entire machine M. The carriage 2 is provided with a switch 28 for turning the motor 9 on and off and a bracket 29 for holding an extension cord 30 on the side thereof. Another control 31 is provided near the top of the carriage 2 to regulate the stroke and amount of pressure delivered to the piston 18 when the handle switch 24 is actuated.

The power cylinder 11 is mounted at a slight angle, but substantially parallel, to the ground. The rear of the cylinder 11 is slightly higher than the tool T under normal circumstances so that the weight of the cylinder 11 maintains the tool T in contact with the ground at all times. The cable 25 is connected to the cylinder 11 forwardly of the pump 10 a predetermined distance so as to make the cylinder 11 easy to pivot upwardly with the movable handle 23.

If desired, and to conserve space in storage, the cylinder 11 may be pivoted upwardly to a position adjacent to the forward portion of the carriage 2. Means may be provided to retain the cylinder 11 in its upward position during this storage.

The universal connection 20 of the machine M may be provided with various forms of tools T, as best shown in FIGS. 3–7. FIGS. 3 and 4 show the tool T in the form of a rake 32 having a horizontal bar 33 with curved teeth 34 therein. The horizontal bar 33 contains a connector 21 adapted to be connected to the universal connection 20. FIG. 5 shows a leaf rake 35 having a horizontal bar 36 and straight teeth 37. The bar 36 is provided with a connector 21 adapted to be connected to the universal connection 20. FIG. 6 shows a snow plow 38 having a curved blade 39. The curved blade 39 has a head bar 40 with a connector 21 thereon. FIG. 7 shows an end view of a snow plow 41 having two sides or blades 42 depending from a head bar 43 having a connector 21 thereon adapted to be secured to the universal connection 20 on the rod 19. The snow plow 41 can be used to push snow away or two pull snow toward the machine M and the operator. If desired, other forms of tools T, such as a broom or a concrete float with a connector 21, may be attached to the universal connection 20 to perform a special function.

It is believed that the operation of the power tool or machine M is clear from the foregoing description. If an operator with heart trouble or other handicap wishes to do hard work in a yard, such as rake leaves, or sweep or shovel snow on a sidewalk, he can use this machine. All that the operator need do is to position the machine properly after the cord 30 has been plugged into a suitable electrical source. The operator maneuvers the machine M into proper position by holding the upper bracket 27 in one hand and the movable handle 23 in the other. The swivel wheels 5 and shoes 7 keep the machine in an upright position at all times and allow the machine to be moved in any direction with ease. The operator then moves the movable handle 23 up or down to properly position the power cylinder 11, rod 19, and tool T, and then merely actuates the control switch 24 on the handle 23 to cause the rod 19 to move a predetermined distance. This movement of the rod 19 may be toward the machine, or rearward, such as when raking. The movement of the rod 19 may be away from the machine when a broom or snow plow is used, so that the hydraulic pressure forces the piston 18 forwardly in order to sweep or push the snow a distance equal to one stroke of the piston 18. The machine M may then be moved forwardly this amount and the process repeated.

What is claimed is:

1. A machine for aiding an operator to do work, said machine comprising a frame having means thereon in contact with the ground, said frame having a carriage thereon, said frame having a motor and pump connected thereto, a power cylinder connected to means on said frame, said cylinder having a piston with a rod extending forwardly thereof, hose connections connecting said power cylinder and said pump for supplying and releasing pressure fluid from either side of said piston, said carriage having a handle movably mounted thereon, said handle having a control thereon for actuating said piston, and means connecting said movable handle with said cylinder so that movement of said handle moves said cylinder.

2. A machine for aiding an operator to do work, said machine comprising a frame having swivel wheels at the rear thereof and slidable means at the front thereof, said frame having an upstanding carriage thereon, said frame having a motor and an oil pump connected thereto, a power cylinder movably connected to means on said frame, said cylinder having a piston with a rod extending forwardly thereof, hose connections at each end portion of said cylinder connected to said oil pump for supplying and releasing pressure fluid from either side of said piston, said carriage having a handle movably mounted thereon, said handle having a control thereon for actuating said piston, and means connecting said movable handle with said cylinder so that movement of said handle moves said cylinder.

3. A machine for aiding an operator to do work, said machine comprisinng a frame having an upstanding carriage thereon, said frame having swivel wheels at the rear thereof and slidable pivotable shoes at the front thereof for maintaining said carriage in an upright position at all times, said frame having a motor and an oil pump connected thereto, a power cylinder pivotally connected to said oil pump, said cylinder having a slidable piston with a rod extending forwardly thereof, hose connections at each end portion of said cylinder connected to said oil pump for supplying and releasing pressure fluid from either side of said piston, said carriage having an upstanding bracket with a handle pivotally mounted thereon, said movable handle having a control switch thereon for actuating said piston, and means connecting said movable handle with said cylinder so that movement of said handle moves said cylinder.

4. The machine set forth in claim 1 wherein said means connecting said movable handle and said cylinder comprises a cable guided by means mounted within said carriage.

5. The machine set forth in claim 4 wherein said cable connecting said movable handle and said cylinder is attached to said cylinder a sufficient distance forwardly of said pump so as to enable said cylinder to be lifted easily by moving said handle.

6. The machine set forth in claim 1 wherein said power cylinder is mounted to extend forwardly of said carriage and substantially parallel to the ground.

7. The machine set forth in claim 6 wherein the rod is provided with a tool.

8. The machine set forth in claim 1 wherein said rod is provided with a universal connection adapted to receive different tools.

9. The machine set forth in claim 1 wherein said rod is provided with a rake.

10. The machine set forth in claim 1 wherein said rod is provided with a snow plow.

11. The machine set forth in claim 1 wherein said rod is provided with a broom.

12. The machine set forth in claim 1 wherein said rod is provided with a concrete float.

References Cited

UNITED STATES PATENTS

| | | | |
|---|---|---|---|
| 1,535,411 | 4/1925 | Hansen | 299—37 X |
| 1,987,982 | 1/1935 | Wheeler | 299—67 X |
| 2,465,192 | 3/1949 | Booth | 299—37 |
| 2,565,841 | 8/1951 | Conforto | 299—37 X |
| 2,705,082 | 3/1955 | Heimsoth | 214—510 |
| 2,835,992 | 5/1958 | Flemer | 37—103 X |
| 2,881,844 | 4/1959 | Miller | 172—110 X |
| 2,904,320 | 9/1959 | Salisbury et al. | 299—37 X |
| 3,057,412 | 10/1962 | Hovis | 172—96 X |

ABRAHAM G. STONE, *Primary Examiner.*

J. R. OAKS, *Assistant Examiner.*